US012707194B2

(12) United States Patent
Hao

(10) Patent No.: US 12,707,194 B2
(45) Date of Patent: Aug. 11, 2026

(54) AUDIO SYSTEM AND METHOD AND DEVICE FOR CONTROLLING THEREOF

(71) Applicant: GOERTEK INC., Weifang (CN)

(72) Inventor: Xuan Hao, Weifang (CN)

(73) Assignee: GOERTEK INC., Weifang (CN)

( * ) Notice: Subject to any disclaimer, the term of this patent is extended or adjusted under 35 U.S.C. 154(b) by 98 days.

(21) Appl. No.: 18/580,714

(22) PCT Filed: Dec. 15, 2021

(86) PCT No.: PCT/CN2021/138408
§ 371 (c)(1),
(2) Date: Jan. 19, 2024

(87) PCT Pub. No.: WO2023/035472
PCT Pub. Date: Mar. 16, 2023

(65) Prior Publication Data
US 2024/0236560 A1 Jul. 11, 2024

(30) Foreign Application Priority Data
Sep. 7, 2021 (CN) ......................... 202111046274.0

(51) Int. Cl.
*H04R 3/12* (2006.01)
*H04R 1/40* (2006.01)

(52) U.S. Cl.
CPC ............... *H04R 1/403* (2013.01); *H04R 3/12* (2013.01); *H04R 2201/401* (2013.01); *H04R 2499/13* (2013.01)

(58) Field of Classification Search
CPC .... H04R 1/403; H04R 3/12; H04R 2201/401; H04R 2499/13
See application file for complete search history.

(56) References Cited

U.S. PATENT DOCUMENTS

2008/0130922 A1* 6/2008 Shibata .................. H04R 5/023 381/1
2014/0348329 A1 11/2014 Christoph
(Continued)

FOREIGN PATENT DOCUMENTS

CN 101583064 A 11/2009
CN 104780488 A 7/2015
CN 105122846 A 12/2015
(Continued)

OTHER PUBLICATIONS

International Search Report from International Application No. PCT/CN2021/138408 mailed Mar. 7, 2022.

*Primary Examiner* — Suhan Ni
(74) *Attorney, Agent, or Firm* — Shih IP Law Group, PLLC

(57) ABSTRACT

The present disclosure discloses an audio system and a method and a device for controlling the audio system. The audio system includes: a directional loudspeaker group comprising a plurality of directional loudspeakers, wherein the plurality of directional loudspeakers are provided at respective first preset positions, wherein the plurality of directional loudspeakers, when operating, are oriented to a second preset position and radiate sound waves thereto, so as to form a three-dimensional regional sound field in a preset transmission area, and wherein the first preset positions and the second preset position are located in the preset transmission area.

10 Claims, 4 Drawing Sheets

(56) References Cited

U.S. PATENT DOCUMENTS

| | | | |
|---|---|---|---|
| 2017/0086005 A1 | 3/2017 | Oh et al. | |
| 2020/0228894 A1* | 7/2020 | Chen ...................... | H04R 1/406 |

FOREIGN PATENT DOCUMENTS

| | | | |
|---|---|---|---|
| CN | 105794230 A | 7/2016 |
| CN | 205946136 U | 2/2017 |
| CN | 109168112 A | 1/2019 |
| CN | 109327769 A | 2/2019 |
| CN | 110072172 A | 7/2019 |
| CN | 110234048 A | 9/2019 |
| EP | 3869820 A1 | 8/2021 |
| WO | 2020256745 A1 | 12/2020 |

* cited by examiner

AUDIO SYSTEM AND METHOD AND DEVICE FOR CONTROLLING THEREOF

The present disclosure claims a priority to a Chinese Patent Application No. 202111046274.0, entitled "audio system and method and device for controlling thereof" filed with China Patent Office on Sep. 7, 2021, the entire contents of which are incorporated into the present disclosure by reference.

TECHNICAL FIELD

The present disclosure relates to a technical field of intelligent audio controlling, and more particularly, to an audio system and a method and a device for controlling the audio system.

BACKGROUND

In the context of intelligence, there are more and more types of audio signals for vehicles, such as audio signals for cars, for example, music, navigation prompts, turning prompts, alarm sounds, etc. A variety of sounds are mixed in the car for a long time, which will increase annoyance of passengers in the car, and demands for the passengers to have independent acoustic environments also increase. For example, the driver wants to listen to music while driving and other passengers are at rest, the best way to play music is to only make the driver hears the music, and other passengers cannot hear or can hear the music in relatively small volume. However, once in-car audio systems of current automotive products on the market are turned on, all persons in the car will sense the audio signal at the same time, but the demands for different persons are different, and their demands cannot be met.

SUMMARY

A main purpose of the present disclosure is to provide an audio system and a method and a device for controlling the audio system, which is intended to realize a function that audio signals are played at different regions independently.

To achieve the above purpose, the present disclosure provides an audio system including:

a directional loudspeaker group including a plurality of directional loudspeakers, wherein the plurality of directional loudspeakers are provided at respective first preset positions, wherein the plurality of directional loudspeakers, when operating, are oriented to a second preset position and radiate sound waves thereto, so as to form a three-dimensional regional sound field in a preset transmission area, and wherein the first preset positions and the second preset position are located in the preset transmission area.

Optionally, the directional loudspeaker group includes a plurality of directional loudspeaker groups, and each of the directional loudspeaker groups is separately provided in one preset transmission area.

Optionally, the audio system further includes:

a plurality of audio input interfaces, wherein a number of the audio input interfaces corresponds to a number of the directional loudspeaker groups, and each of the audio input interfaces is accessed by audio signal of one channel; and a plurality of audio processor, wherein an input end of each of the audio processors is connected to one of the audio input interfaces, and a plurality of output ends of each of the audio processors are connected to a plurality of directional loudspeakers of one of the directional loudspeaker groups in one-to-one correspondence, wherein each of the audio processors is configured to convert an accessed audio signal to audio signals of multiple channels and output the audio signals of multiple channels to respective directional loudspeakers.

Optionally, the audio system further includes:

a plurality of control switches, wherein one of the control switches is provided in series between input ends of every two audio processors, wherein when the control switches are closed, two audio processors connected to each of the control switches process accessed audio signals, and then output processed audio signals to respective directional loudspeakers, so as to realize simultaneous playing of audio signals in a plurality of the preset transmission areas.

Optionally, each of the audio processors further processes the audio signal of one channel into the audio signals of multiple channels according to a vector position between a stored second preset position and each of the first preset positions, and outputs the audio signals of multiple channels to respective directional loudspeakers.

Optionally, the directional loudspeakers are ultrasonic transducers.

Optionally, each of the audio processors comprises:

an audio modulation circuit connected to one of the audio input interfaces, wherein the audio modulation circuit is configured to modulate the accessed audio signal and output modulated audio signals to respective ultrasonic transducers.

The present disclosure also provides a method for controlling an audio system, wherein the audio system comprises a plurality of directional loudspeaker groups, and each of the directional loudspeaker groups is separately provided in one preset transmission area, and wherein the method for controlling the audio system includes:

obtaining an audio system control instruction; and controlling a corresponding directional loudspeaker group in the plurality of directional loudspeaker groups to operate according to the obtained audio system control instruction, so as to play an audio signal in a corresponding preset transmission area.

Optionally, the method for controlling the audio system further includes:

obtaining a user target position in the corresponding preset audio transmission area; and adjusting an angle of an outlet of directional loudspeakers in the corresponding directional loudspeaker group according to the user target position.

The present disclosure also provides a device for controlling an audio system including:

the audio system as described above;

a memory;

a processor; and a program for controlling the audio system stored on the memory, wherein the program for controlling the audio system, when executed by the processor, implements the method for controlling the audio system as described above.

The present disclosure also provides a vehicle including a cavity and the above audio system, wherein the audio system is provided on and/or in the cavity.

Optionally, the vehicle further includes:

a plurality of seats, wherein the audio system includes a plurality of directional speaker groups, and each of the directional loudspeaker groups corresponds to one of the seats.

Optionally, the vehicle further includes a control component, the control component is electrically connected to the audio system.

In the audio system of the present disclosure, a directional loudspeaker group is disposed, each directional loudspeaker group includes a plurality of directional loudspeakers, the plurality of directional loudspeakers are provided at corresponding first preset positions respectively, and the plurality of directional loudspeakers, when operating, radiate sound waves to a second preset position respectively, to form a three-dimensional regional sound field in a preset transmission area. In the present disclosure, the sound waves can be radiated to specified positions according to actual application requirements, so that the user pos1 in the preset transmission area can receive the audio signal played by the directional loudspeaker group, while the audio signal played by the directional loudspeaker group cannot be received in other three-dimensional regional sound fields. Therefore, a function that audio signals are played at different regions independently may be realised. The present disclosure is beneficial to improving the privacy for playing the audio of the user, and at the same time can meet the needs for audio signals of users in different locations in the same space.

BRIEF DESCRIPTION OF DRAWINGS

In order to more clearly illustrate the technical solutions in the embodiments of the present disclosure or the prior art, the drawings required to be used for the content of the embodiments or the prior art will be briefly introduced in the following. Obviously, the drawings in the following description are merely some embodiments of the present disclosure, and for those of ordinary skill in the art, other drawings can also be obtained from the structure as shown in drawings without any creative effort.

Figure 1:
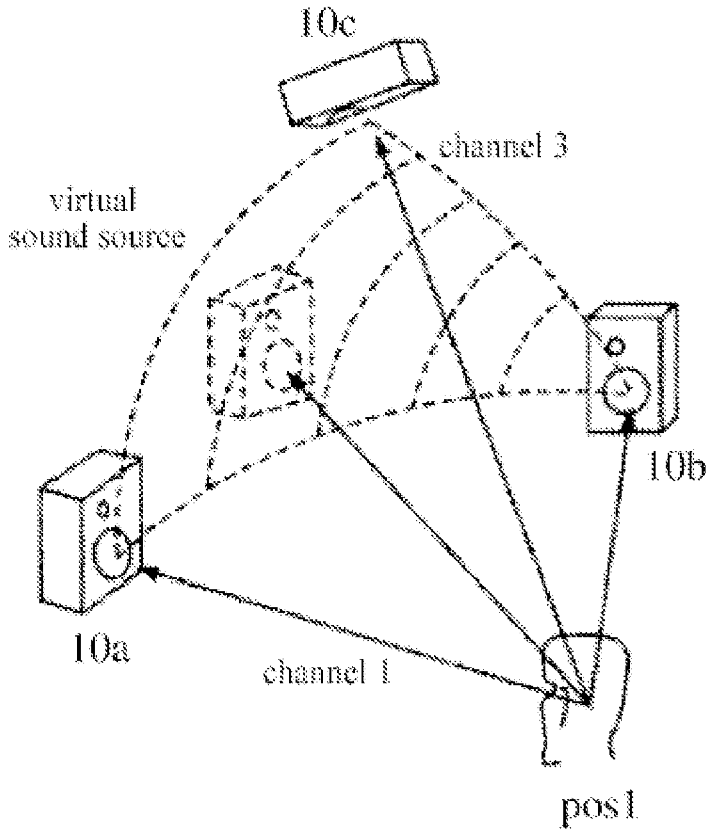
FIG. 1 is a schematic diagram of a three-dimensional regional sound field formed when the audio system is operated of the present disclosure.

Explanation of reference numbers are as below:

| reference numbers | names | reference numbers | names |
|---|---|---|---|
| 10 | directional loud speaker group | 23 | power amplifier |
| 10a, 10b, 10c | directional loud speaker | S1, S2, S3 | control switch |
| 20 | audio processor | AU-in | audio input interface |
| 21 | audio modulation circuit | 100 | cavity |
| 22 | audio amplitude modulation circuit | 200 | seat |

Implementation of purpose, functional features and advantages of the present disclosure will be further explained in conjunction with the embodiments with reference to the drawings.

DETAILED DESCRIPTIONS

Exemplary embodiments of the present disclosure will be described in more detail below with reference to the drawings. Although exemplary embodiments of the present disclosure are shown in the drawings, it should be understood that the present disclosure may be implemented in various forms and should not be limited by the embodiments set forth herein. Rather, these embodiments are provided to enable a more thorough understanding of the disclosure and to enable the scope of the disclosure be transmitted to those skilled in the art completely.

It should be noted that, unless otherwise stated, the technical or scientific terms used in the present disclosure shall have the usual meaning understood by those skilled in the field to which the present disclosure belongs.

In addition, the terms such as "first", "second", etc. in the present disclosure are used to distinguish different objects, rather than to describe a particular order. Furthermore, the terms "comprise", "have" and any variation thereof are intended to cover non-exclusive inclusion. For example, a process, method, system, product or device comprising a series of steps or units is not limited to the listed steps or units, but optionally also includes steps or units not listed, or optionally includes other steps or units inherent to these processes, methods, products or devices.

In the context, the term "and/or" is only an association relation describing an associated object, indicating that there can be three kinds of relations. For example, A and/or B may indicate three situations: there is A alone, there is A and B simultaneously, and there is B alone. In addition, the symbol "/" herein generally indicates that the associated objects back and forth have an "or" relationship.

The present disclosure provides an audio system.

Referring to FIGS. 1 to 5, in an embodiment of the present disclosure, the audio system includes:

a directional loudspeaker group 10 including a plurality of directional loudspeakers (10*a*, 10*b*, 10*c*), wherein the plurality of directional loudspeakers (10$a$, 10$b$, 10$c$) are provided at corresponding first preset positions respectively, and wherein, the plurality of the directional loudspeakers (10$a$, 10$b$, 10$c$), when operating, are oriented to a second preset position and radiate sound waves thereto respectively, so as to form a three-dimensional regional sound field in a preset transmission area. The first preset positions and the second preset position are located in the preset transmission area.

In this embodiment, the first preset positions are installation positions of the directional loudspeakers, respectively, and the second preset position is a target position of audio signals radiated by the directional loudspeakers, for example, a preferable position for sensing the audio signals by a user pos1. This position may be a common state position of the user pos1 in the preset transmission area when the user pos1 is located in the preset transmission area, for example, sitting in the preset transmission area or lying in the preset transmission area etc. The second preset position may be a head position of the user pos1 when the user pos1 is in the preset transmission area. Specifically, the second preset position may be a midpoint between two ears of the listener. Further, when the directional loudspeakers are installed, the outlet of the directional loudspeakers may be oriented toward the head position. In addition, the second preset position may be a fixed position or an adjustable position, when the second preset position is set to the fixed position, each directional loudspeaker is fixed on the first preset position. When the second preset position is set to the adjustable position, for example, when the user is changed from sitting to lying on the back, the head position may be shifted. In this case, the installation position of the directional loudspeaker or the angle of the outlet of the directional loudspeaker may be adjusted to achieve the purpose of adjusting the second preset position, so that the sound radiation direction of the directional loudspeaker always follows the user pos1. In a specific application, the second preset position may be adjusted manually, or by detecting the head position of the user pos1 by disposed cameras, sensors, such as infrared sensors, etc., and then driving the directional loudspeaker by the motor, etc.

The number of the directional loudspeakers in one directional loudspeaker group 10 may be two, three, or four, and specifically, it can be set according to the application area of the audio system and the volume of the product, and there is no restriction thereto. In addition, the plurality of directional loudspeakers (10$a$, 10$b$, 10$c$) may be disposed at equal intervals or non-equal intervals, as long as it is ensured that the vector position defined by the propagation direction of the sound source of the multiple directional loudspeakers (10$a$, 10$b$, 10$c$) can be oriented to the second preset position. When the number of the directional loudspeakers is two, the two directional loudspeakers may be disposed on opposite sides of the second preset position, and distances between each of the directional loudspeakers disposed in the first preset positions and the second preset position may be equal. The distance between one directional loudspeaker and the second preset position, the distance between the other directional loudspeaker and the second preset position, and the distance between the two directional loudspeakers are all equal. When the number of the directional loudspeakers is three, the three directional loudspeakers can be disposed on the left-hand side, the right-hand side and above-head side of the preset sound transmission area, respectively. The directional loudspeakers may be implemented by loudspeakers that can transmit audio signals directionally, such as linear array loudspeakers, ultrasonic loudspeakers, etc. In the following exemplary embodiments of the present disclosure, ultrasonic loudspeakers, especially ultrasonic transducers, are illustrated for example. According to the directional propagation of the ultrasonic wave, the following non-singular wave equation is obtained:

$$\nabla^2 p_s - \frac{1}{c_0^2}\frac{\partial^2 p_s}{\partial_t^2} = -\rho_0 \frac{\partial_q}{\partial_t} \tag{1}$$

In the equation, $$q = \frac{\beta}{\rho_0^2 c_0^4}\frac{\partial p_1^2}{\partial_t};\ \rho_0$$

is fluid density; $p_1$ is fundamental wave sound pressure; $p_s$ is secondary wave sound pressure; $c_0$ is speed of sound; and $\beta$ is nonlinear parameter of the medium.

By solving the equation (1), the secondary wave sound pressure are generated after the nonlinear interaction:

$$p_s = \frac{\rho}{4\pi}\int\int\int_v \frac{1}{|r-r'|}\frac{\partial}{\partial_t} q\left[r,\ t-\frac{|r-r'|}{c_0}\right]dr \tag{2}$$

where r is position vector of observation point; r' is position vector of sound source; v is nonlinear action region. From equations (1) and (2), it can be seen that after the ultrasonic signal modulated by a single frequency sound g(t)=sin ωt is transmitted by the ultrasonic transducer, the modulated wave sound pressure at a distance from an axial x is as follows:

$$p_1 = p_0\left[1 + \mathrm{mg}\left(t-\frac{x}{c_0}\right)\right]e^{-\alpha x}\sin\omega_0\left(t-\frac{x}{c_0}\right) \tag{3}$$

where $p_0$ is ultrasonic sound pressure; $\omega_0$ is ultrasonic frequency; m is modulation depth, which represents a degree to which the carrier amplitude is controlled by the modulated signal; α is carrier frequency. The ultrasonic wave emitted by the ultrasonic transducer propagates in the air, and a signal source of a single frequency audible sound g(t) can be generated in its main sound beam. The equation of the sound source is:

$$q = \frac{\beta p_0^2}{\rho_0^2 c_0^4}e^{-2\alpha x}\frac{\partial}{\partial_t}\left[\mathrm{mg}\left(t-\frac{x}{c_0}\right) + \frac{1}{2}m^2 g^2\left(t-\frac{x}{c_0}\right)\right] \tag{4}$$

The second part on the right side of the equation (4) is the second harmonic component, that is, the distortion component. According to equations (3) and (4), the sound pressure $p_s$ after demodulation at the axial position r of the ultrasonic transducer array is:

$$p_s = \frac{\beta p_0^2 a^2 m}{8\rho_0 c_0^4 \alpha r}\frac{\partial^2}{\partial_t^2} g\left(t-\frac{r}{c_0}\right) \tag{5}$$

From equation (5), it can be seen that the ultrasonic wave emitted by the ultrasonic transducer propagates in the air and the audible sound wave after demodulation still propagates along the axis, which has strong directivity. In order to restore the direction of the sound source in the three-dimensional region, the unit vector of the virtual sound source are synthesized using the unit vectors of the positions of multiple, e.g., two or three, directional loudspeakers (10*a*, 10*b*, 10*c*) according to the vector-based amplitude panning (VBAP) technology, so as to achieve the purpose of constructing the propagation direction of the sound source. For example, when the number of loudspeakers in each loudspeaker group is 3, the 3 loudspeakers may form three sound channels. Refer to FIG. 1, three sound channels formed by the loudspeakers are marked as channel 1, channel 2 and channel 3, respectively. The unit vectors of the three loudspeakers are regarded as base vectors, and a direction of the virtual sound source is obtained by their linear combination. If the unit vectors of the distances between the three speakers and the second preset position are set as $l_1$, $l_2$, $l_3$ respectively, the gains of the audio signals of the loudspeakers are $g_1$, $g_2$, $g_3$ respectively, and the unit vector of the sound source is $l_0$, then $l_0$ can be expressed as:

$$l_0 = g_1 l_1 + g_2 l_2 + g_3 l_3 \quad (6)$$

Then, the gain can be solved as:

$$g = [g_1, g_2, g_3]\begin{bmatrix} l_{11} & l_{12} & l_{13} \\ l_{21} & l_{22} & l_{23} \\ l_{31} & l_{32} & l_{33} \end{bmatrix}^{-1} \quad (7)$$

where $l_i=[l_{i1}, l_{i2}, l_{i3}]$, i=1, 2, 3.

According to equations (6) and (7), three loudspeakers can construct a three-dimensional regional sound field based on the VBAP principle. In this way, based on the sound wave directional propagation technology of the ultrasonic wave, the received high-frequency electrical energy is converted into mechanical vibration by the ultrasonic transducer, and is emitted into the air by the ultrasonic transducer, so that the directional propagation of sound is achieved by the high directivity of the ultrasonic wave itself.

In the audio system of the present disclosure, directional loudspeaker groups 10 are disposed, each directional loudspeaker group includes a plurality of directional loudspeakers, the plurality of directional loudspeakers (10*a*, 10*b*, 10*c*) are provided at corresponding first preset positions respectively, and the plurality of directional loudspeakers (10*a*, 10*b*, 10*c*), when operating, are oriented to a second preset position and radiate sound waves thereto respectively, so as to form a three-dimensional regional sound field in a preset transmission area. In the present disclosure, the sound waves can be radiated to specified positions according to actual application requirements, so that the user pos1 in the preset transmission area can receive the audio signal played by the directional loudspeaker group 10, while the audio signal played by the directional loudspeaker group 10 cannot be received in other three-dimensional regional sound fields. Therefore, a function that audio signals are played at different regions independently is achieved. The present disclosure is beneficial to improving the privacy of the user pos1 playing the audio, which can meet the needs for audio signals of different users pos1 in the same space.

Referring to FIGS. 1 to 5, in an embodiment, there are a plurality of directional loudspeaker groups 10, and each of the directional loudspeaker groups 10 is provided in one preset transmission area.

In this embodiment, the audio system may be applied to vehicles such as cars, trains and airplanes, and may also be applied to public areas such as cinemas, conference rooms, etc. In vehicles such as cars, trains and airplanes and in public areas such as cinemas, conference rooms, etc., there are more than one users pos1. Taking the car for example, when the current speaker equipment plays the audio signal, all persons in the car will sense the audio signal at the same time, but the demands for different persons are different and cannot be met, and the audio system stays in the conventional direct playback, which is unable to implement audio three-dimensional regional playback. For example, the driver needs to listen to navigation information, the co-pilot needs music, and the rear occupant needs quiet rest, which cannot be met at the same time, and the playback of music cannot achieve three-dimensional reproduction of music.

For this reason, the directional loudspeaker group 10 in this embodiment is provided as multiple groups, and each directional loudspeaker group 10 may construct a three-dimensional regional sound field, so that the three-dimensional audios are at different regions independently. The preset audio transmission area is also set in the corresponding place according to the different scenarios applicable to the audio system, which can be the active location of each user pos1 in the region, such as the seat position in the car, the seat in the movie theater, the easy chair, the adjustable back armchair, or the sofa seat position in the family room, etc. This embodiment may provide a directional loudspeaker group 10 for each seat. Moreover, a plurality of the directional loudspeaker groups 10 are provided in an array. The preset transmission areas are separated from each other, or the audio signal radiated by each directional loudspeaker group 10 may be sensed by the user pos1 only in the preset transmission area corresponding to the directional loudspeaker group 10, and may not be sensed by the user pos1 in other areas.

Referring to FIGS. 1 to 5, in one embodiment, the audio system also includes:

a plurality of audio input interfaces AU-in, wherein the number of the audio input interface AU-in corresponds to the number of the directional loudspeaker group 10, and each of the audio input interfaces AU-in is accessed by audio signal of one channel; and a plurality of audio processors 20, wherein an input end of each of the audio processors 20 is connected to one of the audio input interfaces AU-in, and a plurality of output ends of each of the audio processor 20 are connected to a plurality of directional loudspeakers (10*a*, 10*b*, 10*c*) of one of the directional loudspeakers group 10 in one-to-one correspondence, wherein, each of the audio processors 20 converts an accessed the access audio signal to audio signals of multiple channels and outputs the audio signals of multiple channels to corresponding directional loudspeakers respectively.

In this embodiment, the audio input interfaces AU-in may be digital audio access ports or analog audio access ports. Each of the plurality of audio input interfaces AU-in may be accessed by audio signal of one channel. The audio processor 20 may process, for example, decode, modulate, amplify, filter and mix the audio signal, and each audio processor 20 will produce audio signals of multiple channels according to the number of loudspeakers in each directional loudspeaker group 10, and then output them to directional loudspeakers respectively. Each directional loudspeaker will convert the received audio signals to mechanical vibration of respective sound channels. Each of the audio signals accessing the respective audio input interfaces AU-in may be the same or different. For example, when the audio system is applied to vehicles such as cars, and four three-dimensional regional sound fields are set in a driver's seat, a co-pilot's seat, a left rear seat and a right rear seat, respectively, the three-dimensional regional sound field corresponding to the driver's seat may play the navigation information required by the driver, three-dimensional regional sound field corresponding to the co-pilot's seat may play music, and three-dimensional regional sound fields corresponding to the left rear seat and the right rear seat may not play audio, that is, audio signals do not access the audio input interfaces AU-in corresponding to the three-dimensional regional sound fields of the left rear seat and the right rear seat.

Referring to FIGS. 1 to 5, in an embodiment, the audio system further includes:

- a plurality of control switches (S1, S2, S3), wherein one of the control switches (S1, S2, S3) is provided in series between input ends of every two audio processor 20;
- wherein, when the control switches (S1, S2, S3) are closed, two audio processors 20 connected to each of the control switches process accessed audio signals, and then output processed audio signals to corresponding directional loudspeakers respectively, to achieve simultaneous play of audio signals in a plurality of preset transmission areas.

In this embodiment, the control switches (S1, S2, S3) are double wizard switches, that is, the audio signal accessing one audio input interface AU-in may be output to an input end of another audio processor 20 through the control switch, or the audio signal accessing another audio input interface AU-in may be input to the audio processor 20. Moreover, a control switch is provided in series between every two audio input interfaces AU-in. The plurality of control switches (S1, S2, S3) may form a switch array, which can achieve simultaneous play of one audio signal in a plurality of preset transmission areas. Controlling the on/off of one audio input interface AU-in by each control switch may output the accessed audio signal to all audio processors at the same time, so as to realize the same audio signal being played in all three-dimensional regions in the entire region. Any two or more three-dimensional regional sound fields play the same audio signal at the same time may also be realized, so as to form a combination of three-dimensional regional sound fields playing audio at the same time. For example, when the audio system is applied to a movie theater, all the control switches connected to any one channel of audio input interface AU-in among the multiplechannels of the audio input interface AU-in may be controlled to switched on, so as to realize simultaneous play of all the three-dimensional sound fields in the playing hall. When the audio system is applied to a vehicle, such as a four-seat small car, four three-dimensional regional sound fields are set in a driver's seat, a co-pilot's seat, a left rear seat and a right rear seat respectively. By controlling the on/off of the control switch, the audio signal may be played in the four three-dimensional regional sound fields at the same time, and may also be played in two three-dimensional regional sound fields corresponding to the driver's seat and the co-pilot's seat, or two three-dimensional regional sound fields corresponding to the driver's seat and the left rear seat, so as to realize a function that audio signals are played at different regions independently.

Referring to FIGS. 1 to 5, in one embodiment, the audio processor 20 are also configured to process the audio signal of one channel into the audio signals of multiple channels according to a vector position between a stored second preset positions and each of the first preset positions, and output the audio signals of multiple channels to corresponding directional loudspeakers respectively.

It is understood that the first and second preset positions corresponding to each directional loudspeaker group 10 may be set as the same or different. In addition, the second preset positions are set differently according to the height of the head position of the user pos1. In this embodiment, the vector positions of the first preset position and the second preset position may be determined after each directional loudspeaker is installed in the first preset position, and the operating parameter of each directional loudspeaker may be determined. Specifically, a vector position library may be established according to an orientation information between first preset positions and second preset position respectively, and a database may be constructed according to the frequency response generated at the ear drum by the sound of different intensity and different frequency. Before the audio signal is output to the speaker, convolution operation may be performed using the vector position, the database and the head correlation function, so that the audio signal contains information about the location and distance of the sound source, thus forming a three-dimensional audio sound field. For example, when applied to the vehicle, the distances to the positions of seats are different respectively, and an independent audio input is set. One audio processor 20 corresponds to one seat (a preset sound transmission area), and the vector information of the ultrasonic transducer connected to the audio processor 20 may be stored in the audio processor 20 in advance. When the audio signal is input to the audio processor 20, the audio processor 20 may process the audio according to the pre-stored vector information and output the processed audio to the ultrasonic transducer connected to the audio processor 20 itself, and thus a corresponding three-dimensional regional sound field is formed in each preset propagation region.

It is understood that in other embodiments, the audio processor 20 may control the operating state of the loudspeaker at each of the first preset positions according to the usage habits of the user pos1, such as producing sound by only one channel or producing sound by multiple channels at the same time.

Figure 2:
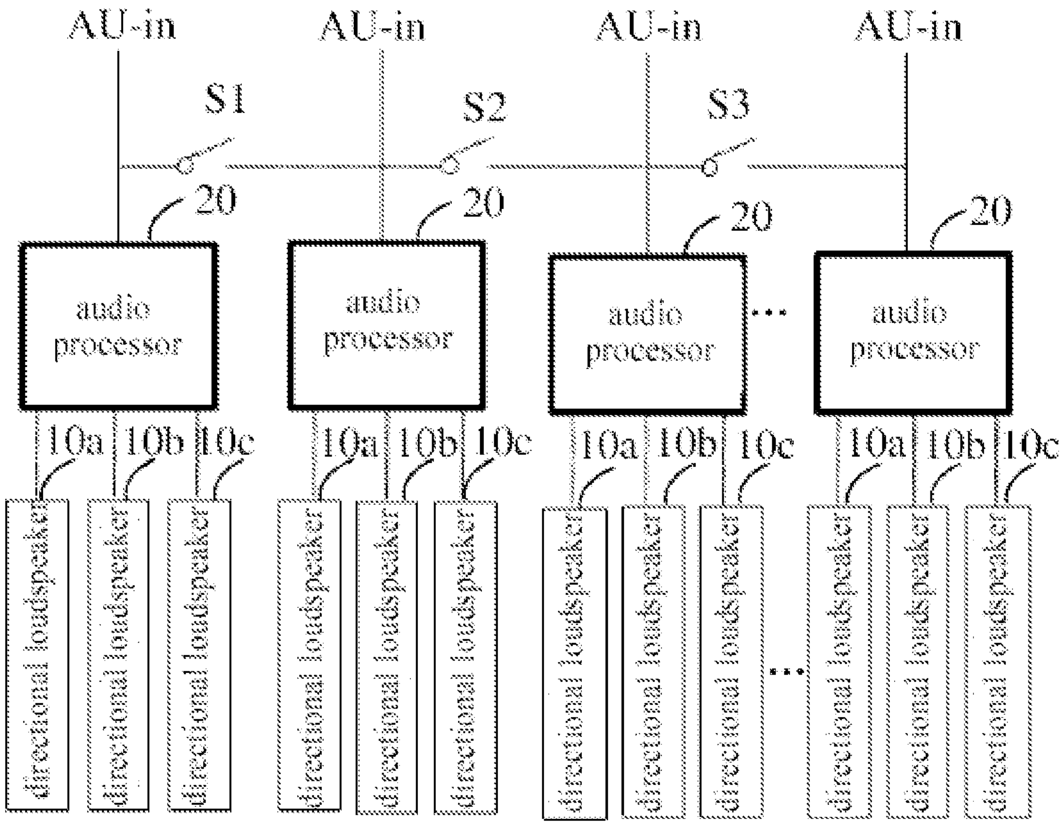
FIG. 2 is a schematic diagram of a circuit structure of the audio system of an embodiment of the present disclosure.
Figure 3:
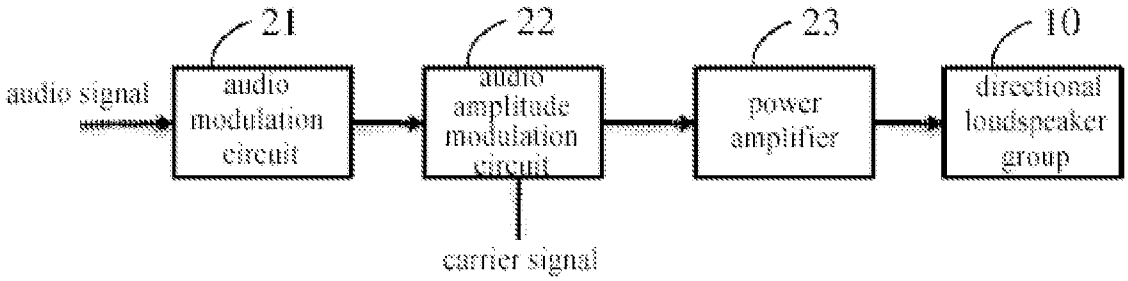
FIG. 3 is a schematic diagram of a circuit structure of the audio processor in FIG. 2 of an embodiment.

Referring to FIG. 2, in an embodiment, each of the audio processors 20 includes:

- an audio modulation circuit 21 connected to one of the audio input interfaces AU-in, wherein the audio modulation circuit 21 modulates the accessed audio signal and then outputs modulated audio signals to corresponding directional loudspeakers respectively;
- audio amplitude modulation circuit 22, wherein two input ends thereof are respectively connected to the audio modulation circuit 21 and the carrier signal input end, and wherein the audio amplitude modulation circuit 22 is configured to modulate the amplitudes of the accessed modulation signal and the carrier signal; and
- a power amplifier 23 provided in series between the audio
- amplitude modulation circuit 22 and the ultrasonic transducer, for amplifying the audio signal and then outputting the amplified audio signal to the ultrasonic transducer.

In this embodiment, the audio modulation circuit 21 processes the input audio signal to generate a modulated signal associated with the input audio signal. The audio amplitude modulation circuit the amplitudes of the modulation signal and the carrier signal. In some embodiments, the audio processor 20 also includes a mixer which may include an analog multiplier and a low-pass filter. The modulation signal and the carrier signal are mixed by the analog multiplier and the low-pass filter, and then the mixed signal is output after power amplification by a power amplifier circuit.

If the signal with an amplitude $U_{\Omega m}$ is the modulation signal, the carrier frequency $f_c$=40 kHz, and the signal with an amplitude $U_{cm}$ is the carrier signal, then the amplitude modulation signal may be obtained according to the following equation:

$$u_{AM}(t) = U_{cm}(1 + m\cos 2\pi f_{\Omega} t)\cos 2\pi f_c t \quad (8)$$

where $$m = k_a \frac{U_{\Omega m}}{U_{cm}},\ k_a$$

is a proportional constant determined by the modulation circuit.

Accordingly, the audio processor 20 modulates the input audio signal, and then the modulated signal is sent out by the ultrasonic transducer. According to the theoretical basis of ultrasonic directional propagation, the ultrasonic wave emitted by the ultrasonic transducer propagates in the air, and the input audio signal may be generated in the directional propagation beam, so that the directional propagation of the audio signal is achieved.

The present disclosure also provides a method for controlling an audio system, wherein the audio system includes a plurality of directional loudspeaker groups, each of the directional loudspeakers is provided in one preset transmission area, and the method for controlling the audio system includes:

Step S100, obtaining an audio system control instruction;

In this embodiment, the audio system control command may be a voice command, a key command, or a control command automatically generated by a sensor, etc. The audio system control instructions may be used to independently control a directional loudspeaker group to operate, or to control a plurality of directional loudspeaker groups to operate at the same time, and specifically, it or they may be controlled according to the actual application needs of customers.

Step S200, controlling a corresponding directional loudspeaker group in the plurality of directional loudspeaker groups to operate according to the obtained audio system control instruction, so as to play an audio signal in a corresponding preset transmission area.

In this embodiment, the audio system may be applied to places with a requirement for an independent acoustic environment, for example, the vehicle, etc. in this embodiment, taking the vehicle as an example, the vehicle has multiple seats, each seat is provided with a directional loudspeaker group correspondingly. When each directional loudspeaker group operates, a three-dimensional regional sound field is formed, and each directional loudspeaker group may be independently controlled by the audio system control instruction. In response to the obtained audio system control instruction, each directional loudspeaker group may be in different states and play the audio signal corresponding to the audio system control instruction. For example, when the audio system is applied to a vehicle, such as a four-seater small car, four three-dimensional regional sound fields are set in a driver's seat, a co-pilot's seat, a left rear seat and a right rear seat respectively. When the audio system control instruction representing the driver's seat voice navigation is received, the directional loudspeaker group corresponding to the driver's seat is controlled to operate and the voice navigation is played. When the audio system control instruction representing the play of the co-pilot's seat music is received, the directional loudspeaker group corresponding to the co-pilot's seat is controlled to operate and the corresponding music is played. Other directional loudspeaker groups (such as that in the rear seat) that do not receive audio system control instruction do not play audio signals. In addition, according to the received audio system control instruction, HIA may control all three-dimensional regional sound fields in the entire area to play the same audio signal at the same time. It may also control any two or more three-dimensional regional sound fields to play the same audio signal at the same time, so as to form a combination of three-dimensional regional sound fields to play audio at the same time. For example, according to the received audio system control instruction, the audio signal may be played in the four three-dimensional regional sound fields at the same time, may also be played in two three-dimensional regional sound fields corresponding to the driver's seat and the co-pilot's seat, or played in two three-dimensional regional sound fields corresponding to the driver's seat and the left rear seat, so as to realize a function that audio signals are played at different regions independently.

The method for controlling the audio system further includes following steps:

Step S300, obtaining a user target position in the corresponding preset audio transmission area;

In this embodiment, the user target location may be a common state position of the user pos1 in the preset transmission area when the user pos1 is located in the preset transmission area, for example, sitting in the preset transmission area or lying in the preset transmission area etc. The user target position may be a head position of the user pos1 when the user pos1 is in the preset transmission area, and specifically, may be a midpoint between two ears of the listener. Further, when the directional loudspeakers are installed, the outlet of the directional loudspeakers may be oriented toward the head position. Moreover, the second preset position may be a fixed position or an adjustable position, and when the user target position is set to the fixed position, each directional loudspeaker is fixed on the first preset position.

Step S400: adjusting an angle of an outlet of directional loudspeakers in the corresponding directional loudspeaker group according to the user target position.

In this embodiment, the user target position is an adjustable position. For example, when the head position is changed from sitting to lying on the back, the head position may be shifted. In this case, the installation position of the directional loudspeaker or the angle of the outlet of the directional loudspeaker may be adjusted to achieve the purpose of adjusting the second preset position, so that the sound radiation direction of the directional loudspeaker always follows the user pos1. In a specific application, the second preset position may be adjusted manually, or by detecting the head position of the user pos1 by cameras, sensors, such as infrared sensors, etc., and then driving the directional loudspeaker by the motor etc.

The present disclosure also provides a device for controlling an audio system, including the above audio system; and a memory; a processor; and a program for controlling the audio system stored on the memory, wherein when the program for controlling the audio system is executed by the processor, the method for controlling the above audio system is achieved.

The detailed structure of the audio system may be referred to the above embodiments and will not be described here. It may be understood that since the audio system is used in the device for controlling the audio system, the embodiments of the device for controlling the audio system in the present disclosure comprise all the technical solutions of all the embodiments of the above audio system, and the technical effects achieved are exactly the same, which will not be repeated here.

In this embodiment, the memory may be used to store software programs and various data. The memory can may comprise a stored program area and a stored data area, optionally, the stored program area may store the operating system, applications required by at least one function (such as sound play function, etc.). The storage data area may store the data created according to the use of the phone (such as audio data, etc.).

The processor is a control center of the audio system applied to the vehicle or other equipment, which uses various interfaces and lines to connect various parts of the entire mobile terminal, performs various functions of the mobile terminal and processes data by running or executing the software programs and/or modules stored in the memory and calling the data stored in the memory, so as to carry out the overall monitoring of the mobile terminal. The processor may include one or more processing units. Optionally, the processor may be integrated with the application processor and the modem processor. Optionally, the application processor mainly deals with an operating system, a user interface and application programs, and the modem processor mainly deals with wireless communication.

From the above description of embodiments, it is clear to those skilled in the art that the above embodiments may be implemented by software plus the necessary common hardware platform, and of course by hardware, but in many cases the former is the preferred embodiment. Based on this understanding, the technical solution of the disclosure in essence or a part thereof that contributes to the prior art may be reflected in the form of a software product. The computer software product is stored in the above storage medium (such as ROM/RAM, disk, optical disc), includes several instructions for making a terminal device (which may be a mobile phone, a computer, a server, a controlled terminal or a network device, etc.) to execute the method of each embodiment of the present disclosure.

The present disclosure also provides a vehicle, the device for controlling the audio system in the above embodiments of the present disclosure may be applied to the vehicle.

Figure 4:
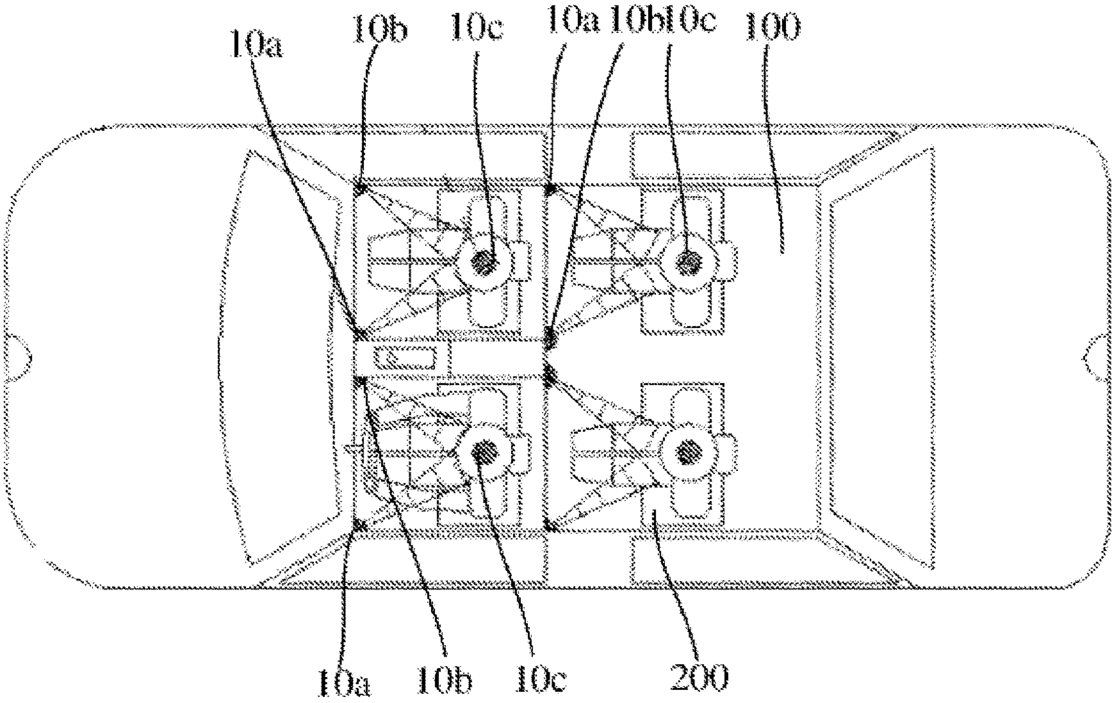
FIG. 4 is a structural diagram of the audio system applied to a vehicle of an embodiment of the present disclosure.

Referring to FIG. 4, the vehicle includes a cavity 100 and the audio system as described above, wherein the audio system is provided on and/or in the cavity 100. The vehicle includes the cavity 100 and the audio system as described above. The detailed structure of the audio system may be referred to the above embodiments and will not be described here. It may be understood that since the above audio system is used in the vehicle of the present disclosure, the embodiments of the vehicle of the present disclosure include all the technical solutions of all embodiments of the above audio system, and the technical effects achieved are exactly the same, which will not be repeated here.

In this embodiment, the audio system may be applied to vehicles such as cars, trains, airplanes, etc. This embodiment takes a car for example, the speaker group in the audio system may be set according to the number of seats 200 of the vehicle, and each speaker may be disposed on the operating platform, or on the roof of the car body, or on the seat of the front seat 200. The loudspeakers may be disposed towards the user's head, such as a face, to radiate audio from front to back towards the user. It may also be disposed towards the user's head, and the loudspeakers may also be disposed on their respective seats to radiate audio towards the user from back to front. The present disclosure applies the audio system to the vehicles. The corresponding directional loudspeaker group 10 is provided in the corresponding seat, and each directional loudspeaker group includes a plurality of directional loudspeakers, the plurality of directional loudspeakers (10*a*, 10*b*, 10*c*) are provided at corresponding first preset positions respectively, and the plurality of directional loudspeakers (10*a*, 10*b*, 10*c*), when operating, are oriented to a second preset position and radiate sound waves thereto respectively, so as to form a three-dimensional regional sound field in a preset transmission area (around the seat). In the present disclosure, the sound waves can be radiated to specified positions according to actual application requirements, so that the user pos1 in the preset transmission area can receive the audio signal played by the directional loudspeaker group, while the audio signal played by the directional loudspeaker group cannot be received in other three-dimensional regional sound fields. Therefore, a function that audio signals are played at different regions independently is achieved, which satisfies the requirements of the users in different seats.

Referring to FIG. 4, in one embodiment, the vehicle also includes:

a plurality of seats 200, the audio system has a plurality of directional loudspeakers (10*a*, 10*b*, 10*c*) groups 10, each of which is provided corresponds to one of the seats 200.

Figure 5:
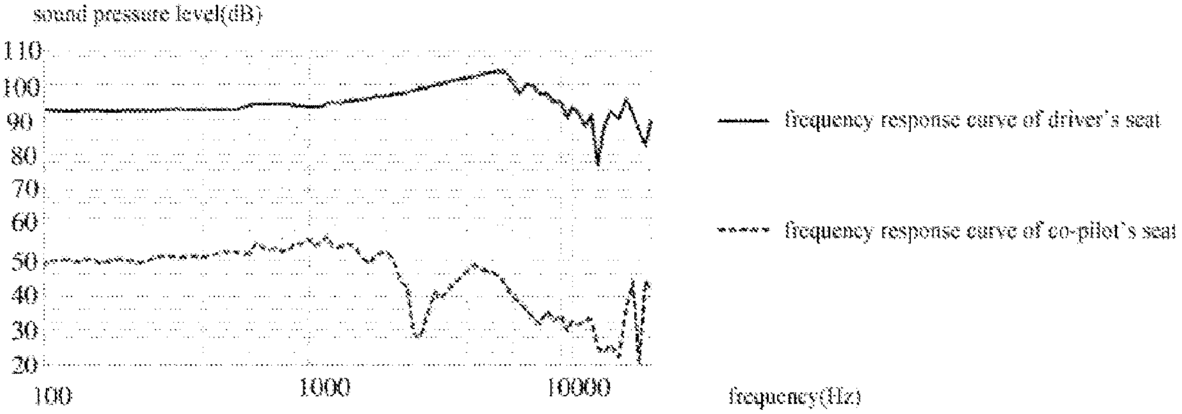
FIG. 5 is a frequency response graph of a driver's seat and a co-pilot's seat of a vehicle of the present disclosure.
Figure 6:
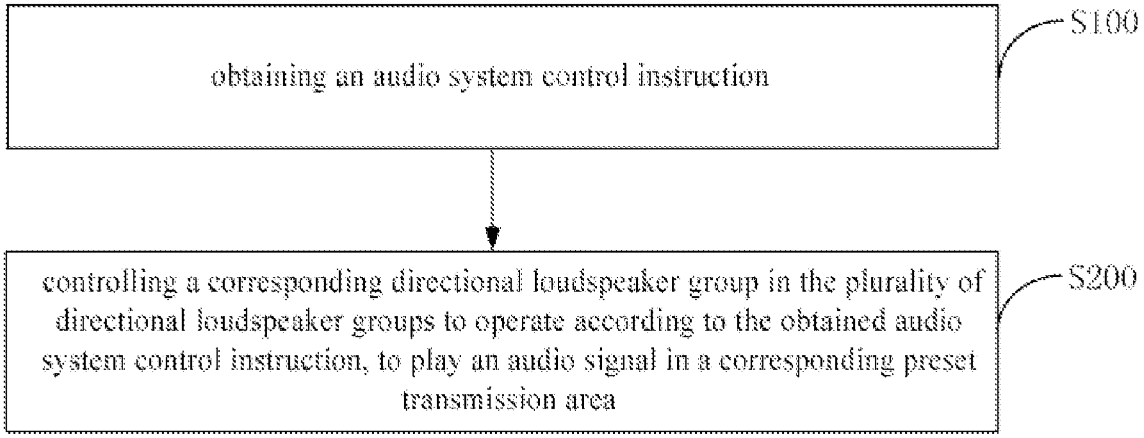
FIG. 6 is a flow diagram showing a method for controlling an audio system of an embodiment of the present disclosure.
Figure 7:
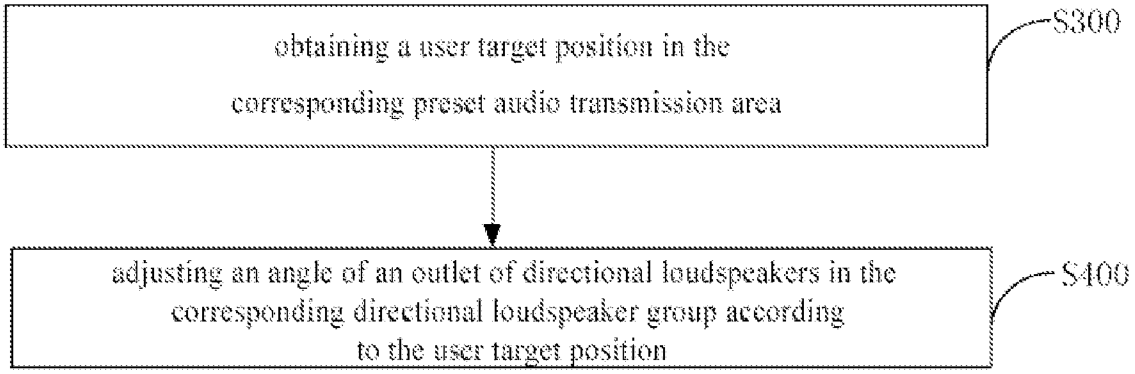
FIG. 7 is a flow diagram showing a method for controlling an audio system of another embodiment of the present disclosure.

In this embodiment, each seat 200 is provided one directional loudspeaker group 10 correspondingly, and each directional loudspeaker group 10, when operates, forms a three-dimensional regional sound field. In general, the left and right positions of the car occupants are relatively close, the distance is about 1 m, and the position of the front and rear occupants is about 1.5 m. Due to the characteristics of sound propagation, the farther the distance is, the lower the sound pressure is. Therefore, if the left and right occupants have better audio separation, the audio separation between the front and rear occupants will be better. In this embodiment, for example, the directional loudspeaker group of the driver's seat operates, and the directional loudspeaker group 10 of the remaining positions do not operate, and the driver's seats are tested respectively, as shown in FIG. 5. FIG. 5 shows frequency response graphs of the driver's seat and the co-pilot's seat. The frequency response of the driver's seat reaches above 90 dB, and the frequency response of the co-pilot's seat is below 60 dB. The general background noise of the car environment is above 60 dB, so it can be said that when the directional loudspeaker group 10 of the driver's seat works, the co-pilot cannot sense the audio information of the driver's seat and thus, a function that audio signals are played at different regions independently is achieved.

Referring to FIG. 4, in one embodiment, the vehicle also includes a control component that is electrically connected to the audio system.

In this embodiment, the control component may include a central controller corresponding to a control switch disposed for each directional loudspeaker group 10 of the audio system. The control switch may be a manually controlled switch, such as a touch screen, a key, etc., or it may be centrally controlled by a central controller. The central controller is electrically connected to the audio system, and may control the operations of the audio processor 20 in the audio system and the control switch, to convert the audio data received or stored in the memory into audio signals and output the converted audio signals as sound when it is in the call signal receiving mode, call mode, recording mode, speech recognition mode, broadcast receiving mode, etc. The control components may also include, but are not limited to, engine temperature controllers, cooling and heating fan controllers, alarm lights, different modes of blowing controllers, fog removal devices, and front fog removal devices.

The above are only preferred embodiments of the present disclosure, and do not limit the patent scope of the present disclosure. Under the inventive concept of the present disclosure, equivalent structural transformations made using the contents of the description and the drawings of the present disclosure, or direct/indirect present disclosures in other related technical fields, are included in the protection scope of the present disclosure.

Each embodiment in this specification is described in a parallel or progressive manner, and each embodiment focuses on the differences from other embodiments. The same or similar parts of each embodiment can be referred to each other. For the device disclosed by the embodiment, the description is relatively simple because it corresponds to the method disclosed by the embodiment, and the relevant points can be described in the method section.

What is claimed is:

1. An audio system comprising:

a directional loudspeaker group comprising a plurality of directional loudspeakers, wherein the plurality of directional loudspeakers are provided at respective first preset positions, wherein the plurality of directional loudspeakers, when operating, are oriented to a second preset position and radiate sound waves thereto, so as to form a three-dimensional regional sound field in a preset transmission area, wherein the first preset positions and the second preset position are located in the preset transmission area, wherein each of the plurality of directional loudspeakers is an ultrasonic loudspeaker, and wherein an ultrasonic carrier signal is modulated by an audio signal to be output by the plurality of directional loudspeakers in a form of ultrasonic wave.

2. The audio system of claim 1, wherein the directional loudspeaker group comprises a plurality of directional loudspeaker groups, and each of the directional loudspeaker groups is separately provided in one preset transmission area.

3. The audio system of claim 2, further comprising:

a plurality of audio input interfaces, wherein a number of the audio input interfaces corresponds to a number of the directional loudspeaker groups, and each of the audio input interfaces is configured to receive the audio signal of one channel; and a plurality of audio processors, wherein an input end of each of the audio processors is connected to one of the audio input interfaces, and a plurality of output ends of each of the audio processors are connected to a plurality of directional loudspeakers of corresponding directional loudspeaker groups in one-to-one correspondence, wherein each of the audio processors is configured to convert an audio signal of one channel to audio signals of multiple channels and output the converted audio signals of multiple channels to respective directional loudspeakers.

4. The audio system of claim 3, further comprising:

a plurality of control switches, wherein one of the control switches is provided in series between input ends of every two audio processors, wherein when the control switches are closed, two audio processors connected to each of the control switches process accessed audio signals, and then output the processed audio signals to respective directional loudspeakers, so as to realize simultaneous playing of audio signals in a plurality of the preset transmission areas.

5. The audio system of claim 3, wherein each of the audio processors is further configured to process the audio signal of one channel into the audio signals of multiple channels according to a vector position between a stored second preset position and each of the first preset positions, and outputs the processed audio signals of multiple channels to respective directional loudspeakers.

6. The audio system of claim 3, wherein each of the audio processors comprises:

an audio modulation circuit connected to one of the audio input interfaces, wherein the audio modulation circuit is configured to modulate the ultrasonic carrier signal by the audio signal and output modulated audio signals to respective ultrasonic transducers.

7. The audio system of claim 1, wherein the ultrasonic wave is demodulated in air to generate an audible sound.

8. A method for controlling the audio system of claim 1, wherein the method for controlling the audio system comprises:

obtaining an audio system control instruction; and controlling a corresponding directional loudspeaker group in the plurality of directional loudspeaker groups to operate according to the obtained audio system control instruction, so as to play an audio signal in a corresponding preset transmission area.

9. The method for controlling the audio system of claim 8, further comprising:

obtaining a user target position in the corresponding preset audio transmission area; and adjusting an angle of an outlet of directional loudspeakers in the corresponding directional loudspeaker group according to the user target position.

10. A non-transitory computer-readable medium storing instructions that, when executed by a processor, cause a processor to perform steps of the method of claim 8.

* * * * *